US006034859A

United States Patent [19]

Baumgärtl

[11] Patent Number: 6,034,859

[45] **Date of Patent: *Mar. 7, 2000**

[54] POWER CIRCUIT-BREAKER WITH CURRENT TRANSFORMERS AND DATA STORAGE DEVICE

[75] Inventor: Ulrich Baumgärtl, Berlin, Germany

[73] Assignee: Siemens Aktiengesellschaft, München, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 09/029,175

[22] PCT Filed: Aug. 30, 1996

[86] PCT No.: PCT/DE96/01654

§ 371 Date: Jun. 4, 1998

§ 102(e) Date: Jun. 4, 1998

[87] PCT Pub. No.: WO97/08725

PCT Pub. Date: Mar. 6, 1997

[30] Foreign Application Priority Data

Aug. 31, 1995 [DE] Germany .......................... 195 33 493

[51] Int. Cl.[7] .......................... H02H 3/00

[52] U.S. Cl. .......................... 361/93.6; 361/93.1

[58] Field of Search .......................... 361/93, 94, 95, 361/96, 97, 98, 93.1, 93.2, 93.3, 93.6

[56] References Cited

U.S. PATENT DOCUMENTS 4,209,817 6/1980 McGinnis .......................... 361/94
5,331,500 7/1994 Corcoles et al. .......................... 361/93
5,331,501 7/1994 Shimp .......................... 361/94

FOREIGN PATENT DOCUMENTS 0 493 272 7/1992 European Pat. Off. .

*Primary Examiner*—Michael J. Sherry
*Attorney, Agent, or Firm*—Kenyon & Kenyon

[57] ABSTRACT

A circuit-breaker with current transformers and with an electronic tripping device having a housing contains a data storage device for characteristic values of the current transformers and the circuit-breaker. The data storage device provided with interfaces to the electronic tripping device and to the current transformers is detachably mounted on the outside of the housing of the tripping device.

4 Claims, 1 Drawing Sheet

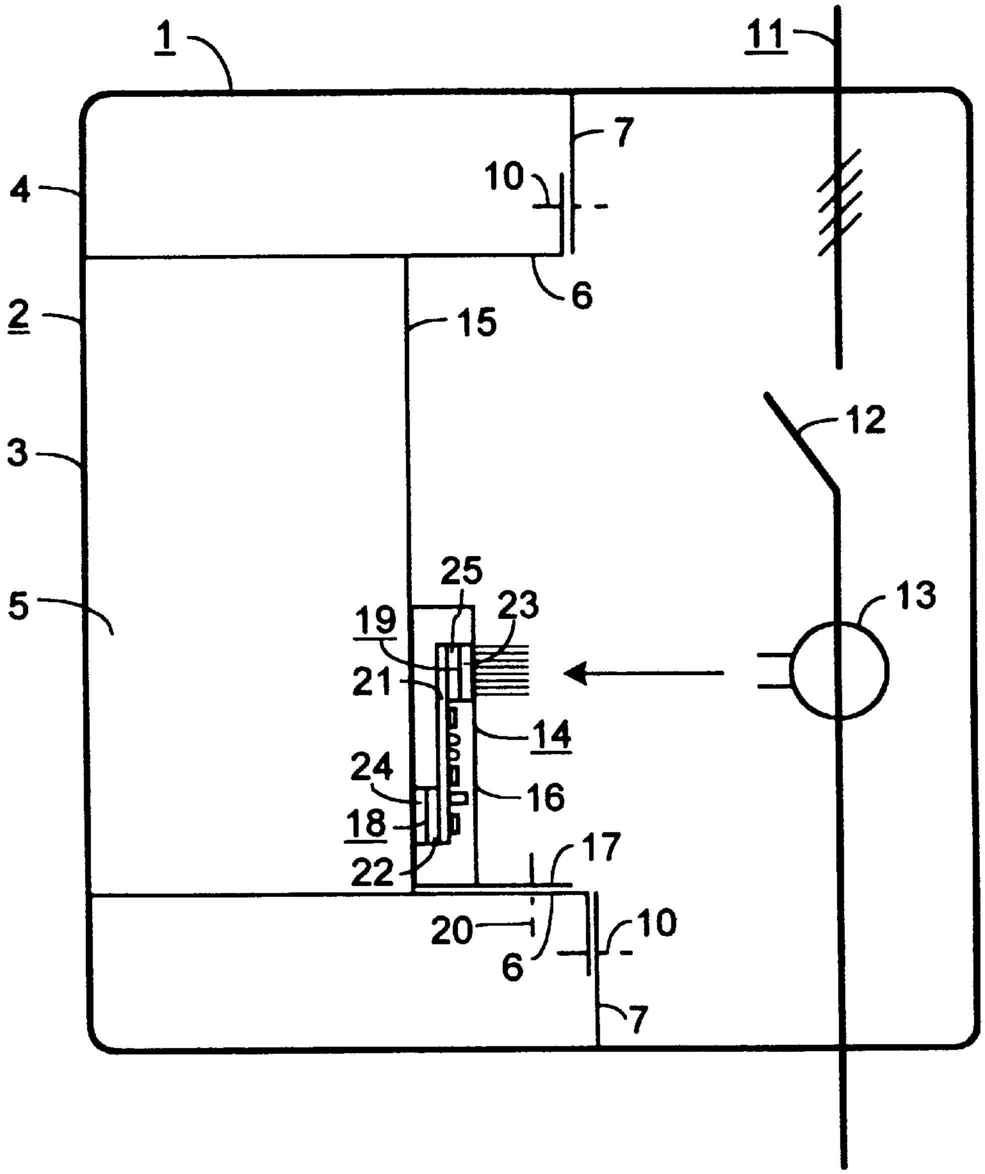
1
11
7
10
4
6
2
15
12
3
25
23
5
19
13
21
14
24
16
18
17
22
20
10
6
7

POWER CIRCUIT-BREAKER WITH CURRENT TRANSFORMERS AND DATA STORAGE DEVICE

FIELD OF THE INVENTION

The present invention relates to a circuit-breaker with current transformers and with an electronic tripping device having a housing. In particular, the present invention relates to a circuit-breaker for processing signals supplied by the current transformers, the circuit-breaker including a data storage device for storing characteristic values of the circuit-breaker.

BACKGROUND INFORMATION

U.S. Pat. No. 5,331,500 describes a circuit-breaker. A data storage device which is described therein is an interface card which is fixedly secured to the support of a circuit-breaker in such a way that an operative connection with the tripping device is not established until the tripping device is inserted into the circuit-breaker. Signals from the current transformer are sent to the tripping device through lines connecting the current transformer to the interface card. The tripping device thus receives information about the characteristics of the circuit-breaker.

Due to the fact that the data storage device is a fixed component of the circuit-breaker and the characteristic values are stored in the tripping device itself, this reliably achieves the result, in comparison with another conventional method, that invariable features of the circuit-breaker such as the type and rated current as well as the characteristics of the current transformers which are also permanently installed in the circuit-breaker are invariably taken into account even when the electronic tripping device is replaced. However, this means that when a fault occurs and the electronic tripping device is subsequently tested, such faults which have occurred in the data storage device are not detected. Furthermore, greater caution is required when the current transformers of the circuit-breakers are to be replaced and therefore the data storage device must also be adjusted or replaced.

SUMMARY OF THE INVENTION

An object of this present invention is to improve the functional test and fault finding in circuit-breakers with a data storage device of the aforementioned type.

According to the present invention, this object is achieved because the data storage device, which is designed with interfaces to the tripping device and the current transformers, is detachably mounted on the outside of the tripping device. This achieves the result that the tripping device can be removed from the circuit-breaker only together with the data storage device. Therefore, if a functional test is performed on a tripping device removed from the circuit-breaker, the data storage device is necessarily included in the functional test. If a malfunction is found, this ensures that the troubleshooting will extend equally to the tripping device itself as well as the data storage device. If it proves to be necessary to replace only the tripping device, the data storage device can be separated from the respective tripping device and attached to the new tripping device. The characteristic values are transferred with the data storage device.

The data storage device may be arranged on the rear wall facing away from the operating front of the tripping device. The interface to the tripping device and the interface to the current transformers may be arranged on opposite sides of a circuitboard of the data storage device. This permits an expedient mounting of the data storage device on the tripping device with a small overall depth.

To ensure a reliable electric connection between the tripping device and the data storage device, the data storage device may have a separate housing with a fastening element that serves to connect it to the tripping device.

BRIEF DESCRIPTION OF THE DRAWING

The FIGURE illustrates a side view and a sectional view of a circuit-breaker in accordance with an exemplary embodiment of the present invention.

DETAILED DESCRIPTION OF THE INVENTION

The FIGURE shows schematically a side view and a sectional view of a low-voltage circuit breaker with an electronic tripping device that is accessible on the front side and a data storage device arranged on the back of the tripping device.

A circuit-breaker 1 in accordance with an exemplary embodiment of the present invention is shown in the FIGURE. An electronic tripping device 2 is accommodated in circuit-breaker 1 so that its operating face 3 is accessible on the front side 4 of circuit-breaker 1. A housing 5 of tripping device 2 has fastening legs 6 which are in contact with abutments 7 of circuit-breaker 1 and are connected to them by connecting means 10, which are indicated schematically.

Circuit-breaker 1 has conducting paths 11, which are indicated schematically, each with a switch contact system 12. Each conducting path is provided with a current transformer 13 whose output signal serves to control electronic tripping device 2.

A data storage device 14 is arranged on rear wall 15 which is opposite the operating face 3 of electronic tripping device 2. Data storage device 14 has its own housing 16 with a fastening element 17 which is provided for bearing contact with the lower fastening leg 6 of housing 5 of tripping device 2 and is to be connected to the latter by a fastening means 20, which is also indicated schematically. Interfaces 18 and 19 permit a simple electric connection of the data storage device to tripping device 2 and current transformers 13.

Housing 16 of data storage device 14 contains a circuitboard 21 with components that serve to transmit signals supplied by current transformers 13 and characteristic values for the current transformers and the circuit-breaker. Circuitboard 21 is provided with components 22 and 23 of plug connectors on opposite sides. Other components of these plug connectors include a receptacle 24 and a multipoint connector 25. Component 22 works together with receptacle 24 which is arranged on rear wall 15 of housing 5 of electronic tripping device 2, while component 23 is freely accessible for plugging in the multipoint connector 25 for connection to current transformers 13. Components 22 and 24 together form interface 18, and components 23 and 25 form interface 19. As will be understood by a person of ordinary skill in the art, electronic tripping device 2 can be removed from circuit-breaker 1 together with data storage device 14 after removing fastening devices 10. If another tripping device is to be installed into circuit-breaker 1, data storage device 14 is first detached by removing fastening means 20 and separating component 22 from receptacle 24 and it can be attached to the new tripping device in the same way. Thus, the characteristic values specific to current transformers 13 and the type of circuit-breaker 1 are also imparted to the new tripping device.

If electronic tripping device 2 is removed from circuit-breaker 1 for testing, the test can be performed first for the unit of the tripping device plus data storage device and, if necessary, it can be continued for tripping device 2 and data storage device 14 separately. Therefore, it is also possible to detect a defective data storage device more easily and replace it if necessary.

I claim:

1. A circuit-breaker, comprising:

a current transformer providing a plurality of signals;

an electronic tripping device processing the plurality of signals provided by the current transformer, the electronic tripping device including a first housing, the first housing having an outside portion, a rear wall and an operating face;

a data storage device storing characteristic values of the circuit-breaker, the data storage device including at least one interface to the electronic tripping device and to the current transformer, and being detachably mounted on the outside portion of the first housing, the first housing being arranged on the real wall of the first housing facing away from the operating face of the first housing.

2. The circuit-breaker according to claim 4, wherein the data storage device is positioned its own second housing, the second housing including a fastening device to couple the data storage device to the tripping device.

3. The circuit breaker according to claim 1, wherein the electronic tripping device including the first housing is removably mounted in the circuit breaker.

4. The circuit breaker according to claim 1, wherein the first housing is separate from a second housing of the circuit breaker.

* * * * *